D. W. SELLEK.
GOVERNOR FOR MOTOR VEHICLES.
APPLICATION FILED MAR. 12, 1918.

1,338,196.

Patented Apr. 27, 1920.
3 SHEETS—SHEET 1.

Inventor:
David W. Sellek.
By Cheever & Cox
Attys

D. W. SELLEK.
GOVERNOR FOR MOTOR VEHICLES.
APPLICATION FILED MAR. 12, 1918.
1,338,196. Patented Apr. 27, 1920.
3 SHEETS—SHEET 2.
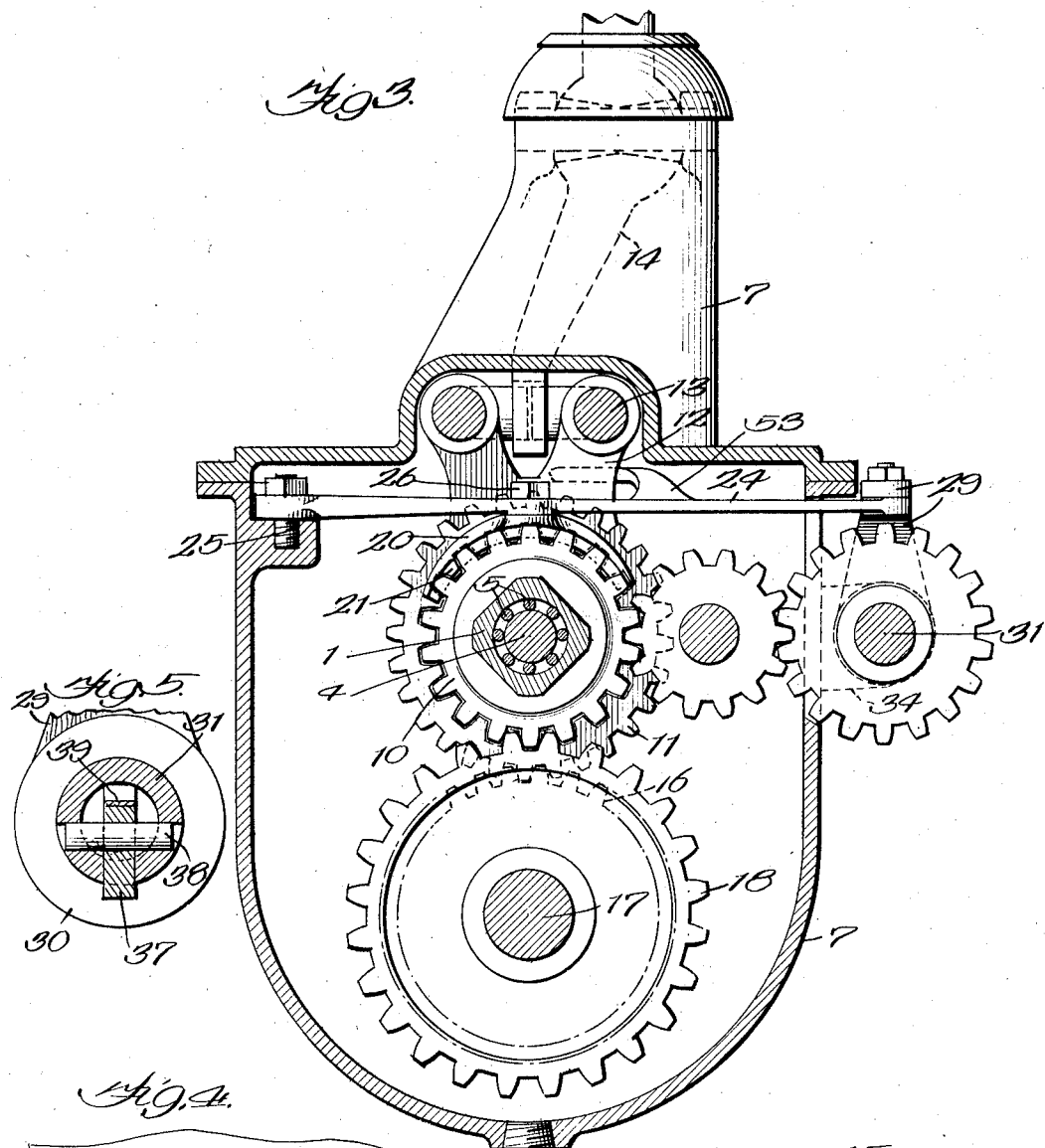
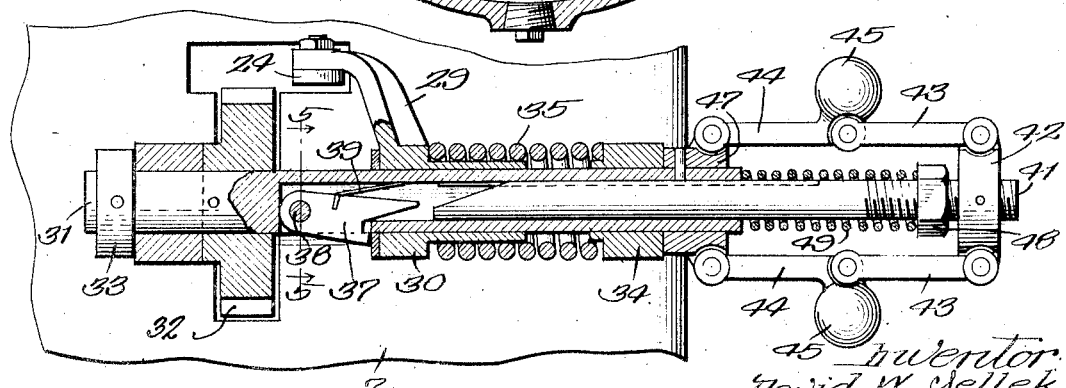

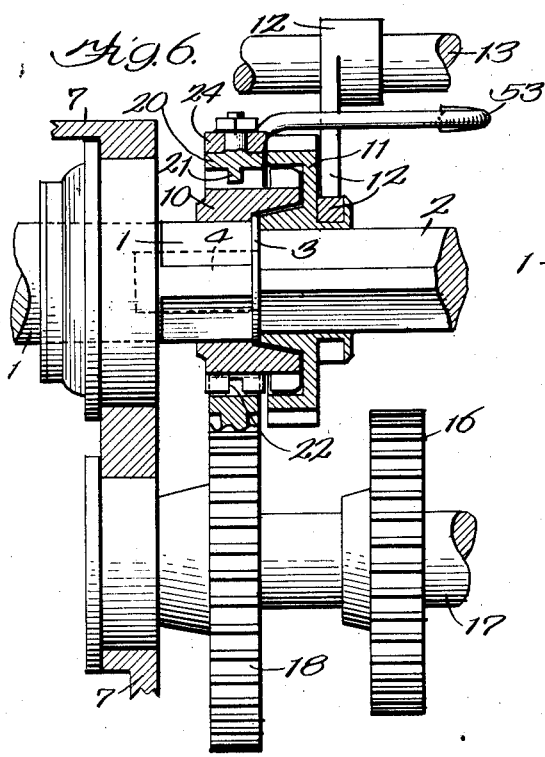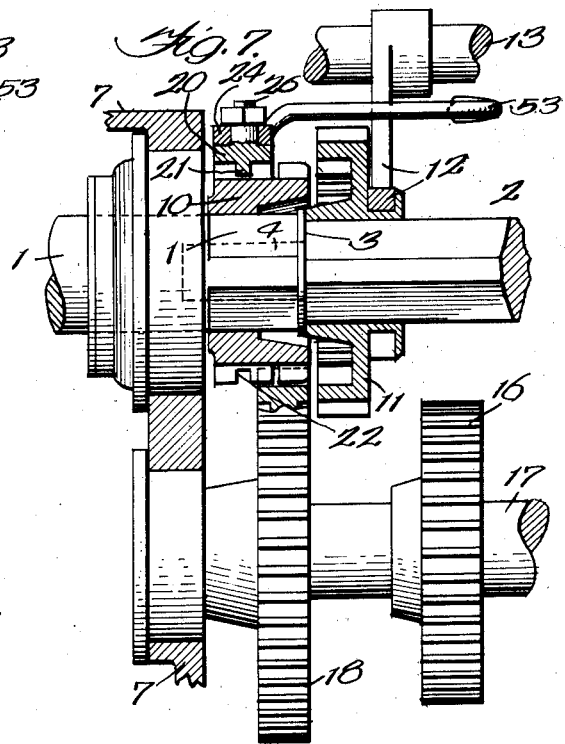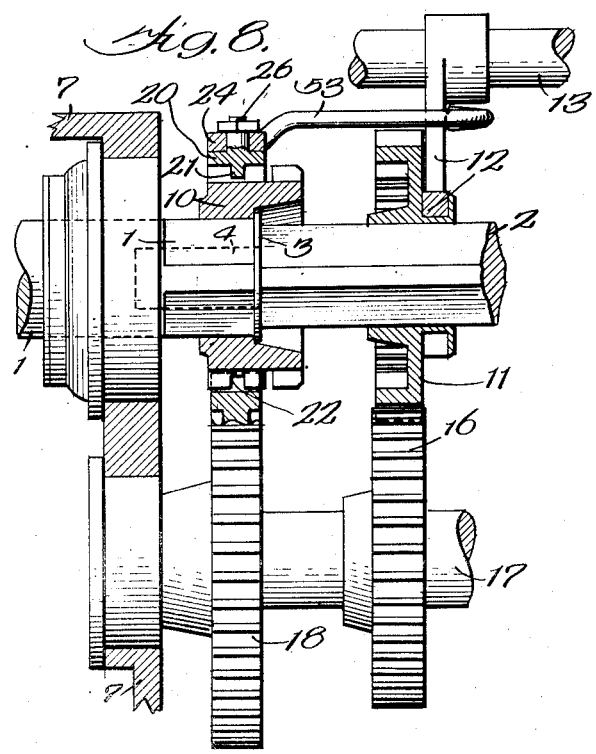

UNITED STATES PATENT OFFICE.

DAVID W. SELLEK, OF CHICAGO, ILLINOIS.

GOVERNOR FOR MOTOR-VEHICLES.

1,338,196.  Specification of Letters Patent.  Patented Apr. 27, 1920.

Application filed March 12, 1918. Serial No. 222,003.

*To all whom it may concern:*

Be it known that I, DAVID W. SELLEK, a citizen of the United States, residing at Chicago, in the county of Cook and State of Illinois, have invented a certain new and useful Improvement in Governors for Motor-Vehicles, of which the following is a specification.

My invention relates to speed governors, especially for motor vehicles. Viewed in one aspect, the general object is to provide speed limiting mechanism applied to the transmission in distinction to being applied to the carbureter, sparking device or other parts of the vehicle. Viewed more specifically, it is my purpose to provide means whereby when the critical speed is reached, the governor will render the transmission non-functioning and will prevent the driver from again causing it to function until he has shifted to a lower speed,—in other words, when the vehicle exceeds a preordained speed, the transmission ceases to transmit power from the source of power to the tractor wheels, and the driver cannot restore the transmission to functioning condition except by first changing to a slower speed. Ancillary objects are to provide mechanism contributing to the ease and certainty of operation of the device and means for making various adjustments. These will be understood as the description proceeds. Another object of the invention is to provide a signal by which the operator will be warned before the vehicle actually reaches the speed at which the transmission will be rendered non-functioning.

I obtain my objects by the mechanism illustrated in the accompanying drawings, in which:

Fig. 3 is a transverse sectional elevation on the line 3—3, Fig. 1.

Fig. 4 is a side elevation, parts being in section on the line 4—4, Fig. 2.

Fig. 5 is a vertical section on the line 5—5, Fig. 4.

Figs. 6, 7 and 8 are views showing various elements of the transmission in changed positions.

Similar numerals refer to similar parts throughout the several views.

Figure 1:
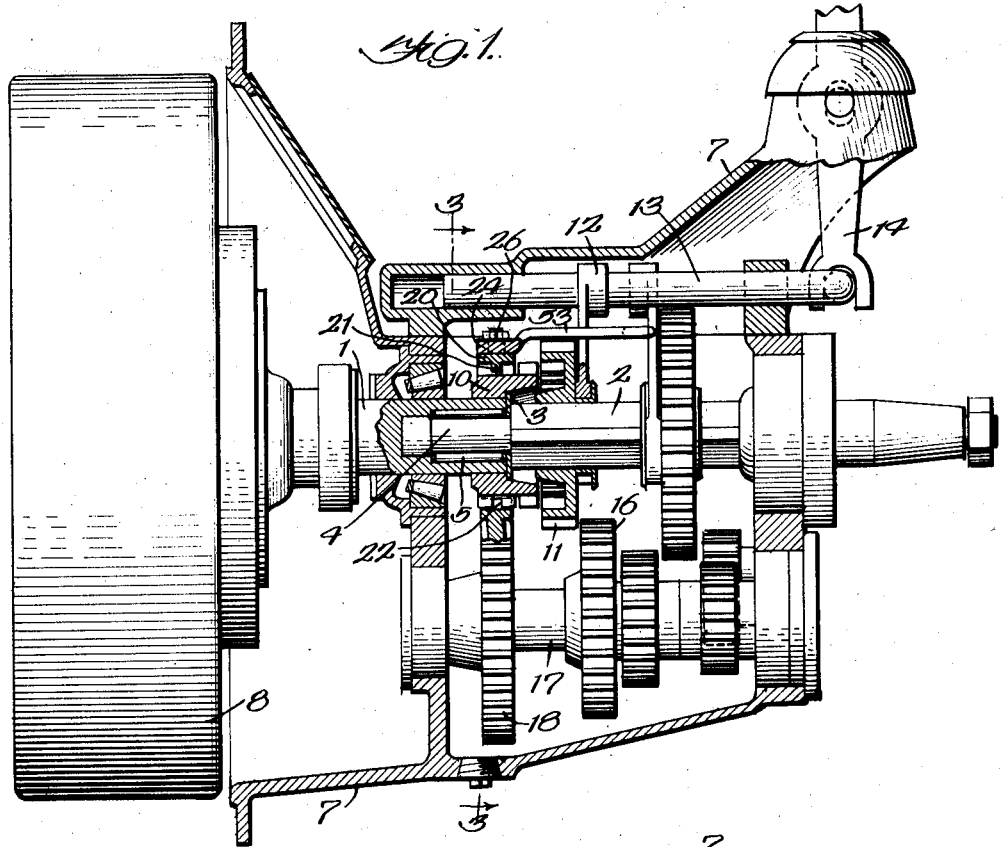
Figure 1 is a side elevation, partly in central section showing the assembled device.

It will be understood that transmissions for motor vehicles may assume various forms and yet embody the same or analogous principles. In the accompanying drawings, however, I have shown a form of transmission which will explain the invention and enable others skilled in the art to practice it. In the particular form illustrated in the drawings the driving shaft 1 is in line with the driven shaft 2 with their proximate ends adjacent to each other, but separated by a collar 3 which abuts against a shoulder formed on the driven shaft 2. The driven shaft has a portion 4 of reduced diameter which enters into a recess in the end of the driving shaft, as best shown in Fig. 1. By preference, a roller bearing 5 is provided at this point to reduce the friction between the driving and the driven shaft. The principal parts of the transmission are inclosed within a casing 7 of suitable design, and the driving shaft may be provided with a fly wheel 8. Slidably mounted upon the driving shaft is a driving wheel 10. Slidably mounted upon the driven shaft 2 is a shifting gear wheel 11. This is controlled by a fork 12 fastened to a rod 13 which is slidably mounted in the casing and is operated by the shifting lever 14. In the form shown, the shifting gear wheel 11 has internal teeth for meshing with external teeth formed upon the driving wheel 10, and external teeth for meshing with the intermediate gear wheel 16. Wheel 16 is rigidly secured to intermediate shaft 17 which has another intermediate gear wheel 18 fastened to it. Wheel 18 meshes with the external teeth upon gear wheel 10.

Driving gear wheel 10 is capable of occupying two positions, viz: that of operative position shown in Figs. 6 and 8 and the non-operative position shown in Fig. 7. In either position it meshes with the intermediate gear wheel 18, but it is only when in operative position that it is capable of meshing with the shifting gear wheel 11. According to this particular design, when the transmission is in high speed the shafts 1 and 2 are locked together through the medium of the two wheels 10 and 11. When a lower speed is desired the gear wheel 11 is shifted to the position shown in Fig. 8 in which it meshes with the intermediate gear wheel 16. When the driven gear wheel 11 is in high speed position, the transmission will function to transmit power in case the driving gear wheel 10 is in operative position, but the transmission will cease to function when moved to non-operative position unless the gear wheel 11 is shifted into engagement with gear wheel 16.

Figure 2:
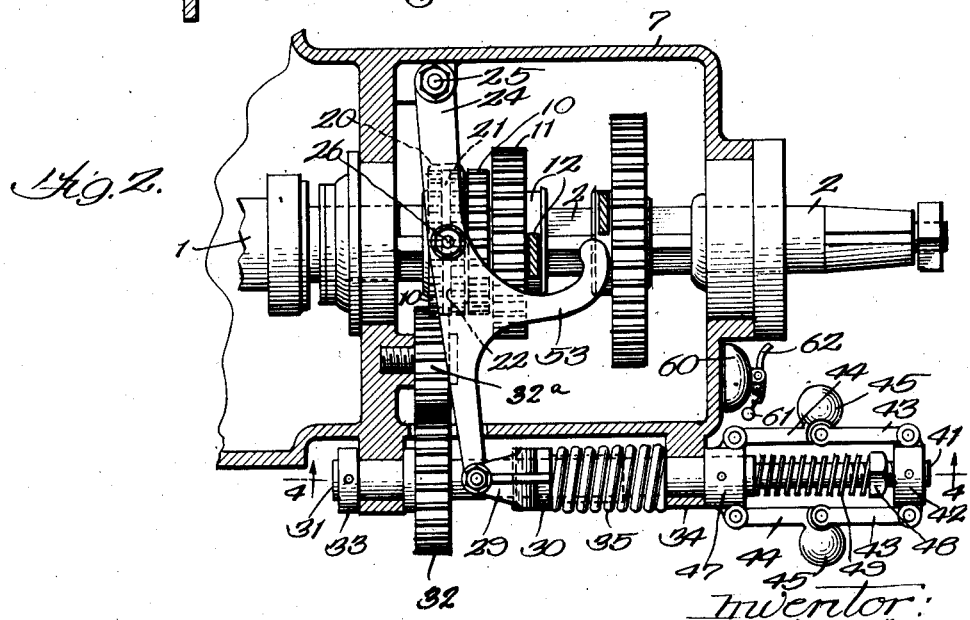
Fig. 2 is a top plan view, partly in central section, of the parts shown in Fig. 1.

The driving gear wheel is shifted from one position to the other by means of a fork 20 which has a spline 21 which fits within an annular slot 22 formed in the toothed periphery of the wheel. This fork forms a gear shifter and is controlled by a resetting lever 24 fulcrumed on a pin 25 in casing 7, as best shown in Figs. 2 and 3. Lever 24 is pivotally connected to fork 20 by the pin 26.

At its free end the resetting lever is articulately connected to the arm 29 extending from the sleeve 30 which slides upon the governor shaft 31, as best shown in Fig. 4. The governor shaft is rotated by a gear wheel 32 connected by means of an idler gear wheel 32ª to the driving gear wheel 10. The shaft is journaled in two brackets 33 and 34 formed upon casing 7, as shown in Figs. 2 and 4. A helical compression spring abuts at one end against the bracket 34 and at the other end engages sleeve 30 for the purpose of urging it in a direction to move the lever 24 in a direction to shift the driving gear wheel 10 from operative to non-operative position. This action of the spring is normally prevented by a latch 37 which is adapted to engage the end of sleeve 30. This latch is mounted within the cylindrically bored governor shaft 31 and is pivotally mounted therein upon the pin 38, as shown in detail in Fig. 5. A spring 39 constantly urges the latch down to acting position, as shown in Fig. 4. The nose of this latch is beveled to be engaged and lifted by the sliding rod 41 of the governor mechanism. The governor has a collar 42 pinned or otherwise rigidly fastened to it. Two links 43 are articulately connected to the collar at diametrically opposite sides thereof. At the free end, these links are articulately connected to similar links 44 which are provided with governor weights 45. At the opposite ends the links 44 are articulately connected to a collar 47, which is pinned or otherwise rigidly fastened to governor shaft 31. Rod 41 is threaded near its outer end to take an adjusting nut 48. Between nut 48 and the end of the governor shaft is a helical compression spring 49. The parts last mentioned constitute a centrifugal or fly ball governor and the parts are so arranged and designed that when a pre-ordained speed is reached the links 43 and 44 will have moved outwardly an amount sufficient to have moved the governor rod far enough into the governor shaft 31 to lift the latch 37 and release the sleeve 30·so that the spring 35 may swing the lever 24 to a position where the driving wheel 10 will become non-operative. The point at which this action will occur may be varied by varying the position of the nut 48 on the governor rod and thus regulate the tension in the governor spring 49.

It will be observed that the latch 37 forms a releasable holding or locking device for maintaining the driving gear wheel 10 in operative position, regardless of the position which the shifting gear 11 occupies. In the illustrated form, this latch constitutes a positive lock, and the lock will remain set so long as the critical speed is not reached. As soon as the critical speed has been reached, and the driving gear wheel shifted to non-operative position, the transmission ceases to function as a transmitter and the driver is powerless to again cause it to function until he has shifted the gears to a slower speed position. This will be understood by referring primarily to Fig. 2 in which it will be seen that the resetting lever 24 has a branch 53 which extends around the opposite side of the fork 12. The parts are so configurated that the operator can actuate the resetting lever only by shifting the shifting lever 12 toward the position which will bring the gear wheel 11 in mesh with the gear wheel 16. In other words, it is only by shifting the gear wheel 11 to a lower speed position that the resetting lever 24 can be made to shift the sleeve 30 to a position where it can be engaged by the latch 37.

It is desirable that the driver should have a warning before the transmission is put in non-functioning condition. With this in view, I have provided a warning signal which, in the present case, is audible. A bell 60, shown in Fig. 2, is mounted upon the side of casing 7. This has a hammer 61 controlled by a lever 62 which is located in such position that as the governor weights fly outward, they will move toward it and actuate the hammer. The weights will ordinarily move quite gradually, and hence the lever 62 will begin to vibrate under the rotation of the governor weights before the rod 41 has moved far enough to actually lift the latch 37. Thus, the bell will begin to sound before the transmission is rendered non-functioning, and hence the driver is given a warning that he is approaching the speed limit and afforded an opportunity to slow down before the governor device takes final effect.

The operation of the device will now be readily understood. Assuming that the parts have been set in normal position shown in Fig. 4, the driving gear wheel 10 will be in operative position and the driven gear wheel 11 may be shifted to high or low speed at will without affecting the driving gear wheel, provided, of course, that the speed limit is not exceeded. Upon exceeding the limit, however, the governor moves the rod 41 to a position to lift the latch 37, thus permitting the spring 35 to shift the driving gear wheel to non-operative position. This breaks the connection between the source of power and the tractor wheels of the vehicle, and the operative or functioning condition cannot be restored until the driver has shifted the gear wheel 11 to a slower speed, to-wit: in engagement with the gear wheel 16.

It will be noted that in the illustrated construction the spring 35 acts only in one direction—that is, it abuts one side only of the sleeve 30 and has no power to draw the sleeve in the opposite direction. Hence, this may for convenience, be termed "a one way engagement connection."

Having thus described my invention, what I claim as new, and desire to secure by Letters Patent, is:

1. A transmission for motor vehicles having two coöperating toothed gear wheels, meshing peripherally, one for driving the other, said wheels having parallel axes and one being axially shiftable to connect and disconnect with and from the other; and speed controlled means including two parts having a one way engagement connection adapted to shift the shiftable wheel to one side of its companion when a predetermined speed is reached.

2. A transmission for motor vehicles having two spur gear wheels meshing peripherally, one for driving the other, one of them being axially shiftable to be disconnected from the other, a spring having a one way engagement connection with the shiftable gear wheel for shifting it out of mesh, holding means for holding said spring in restraint, and speed responsive means for releasing said holding means when a predetermined speed is reached.

3. A transmission for motor vehicles having two spur gear wheels meshing peripherally, one for driving the other, one of them being axially shiftable to be disconnected from the other, a spring having a one way engagement connection with the shiftable gear wheel for shifting it out of mesh, holding means for holding said spring in restraint, releasing means for causing said holding means to let go and thereby permit the spring to shift the shiftable wheel, and speed responsive means operative upon said releasing means and adapted, when a predetermined speed is reached, to move said releasing means to releasing position and to hold it there until the speed drops below the predetermined value.

4. In a selective gear transmission, a governor, and two coöperating elements, one of which is manually movable to change the speed, and the other is movable under the influence of the governor to bring it out of coöperative relation with said manually movable element.

5. In a selective gear transmission, a governor and two coöperating gear wheels, one of said gear wheels being manually shiftable to select the speed and the second being shiftable to be brought into and out of coöperative relation with the first of said gear wheels, and speed controlled means for shifting the second of said gear wheels.

6. A selective transmission for motor vehicles having in combination, a driving shaft, a driven shaft, a governor, a gear wheel slidable upon the driving shaft, a second gear wheel slidable upon the driven shaft, one of said gear wheels being shiftable into and out of driving relation with the other, and the second being shiftable to change the speed transmitted by the transmission, one of said gear wheels being controlled by the governor, and the other being controlled manually.

7. A structure as specified in claim 6 further characterized by the fact that the two shafts are in alinement and have their ends substantially abutting each other.

8. A structure as specified in claim 6 further characterized in having the gear wheel on the driving shaft controlled by the governor, and the one on the driven shaft controlled manually.

9. In a selective change speed transmission, a governor, a driving gear wheel, a driven gear wheel, and intermediate gearing, the driven gear wheel being manually shiftable to one position in which it is connected at one speed ratio to the driving gear wheel, and shiftable to another position in which it is connected at a second speed ratio to the driving wheel, and means operated by the governor for shifting the driving wheel to a position where it is non-operative upon the driven gear wheel regardless of the position of the latter.

10. A structure as specified in claim 9 further characterized in that the driven gear wheel in one position is capable of being direct connected to the driving gear wheel.

11. A structure as specified in claim 9 having two shafts in alinement with each other with ends adjacent, one having the driving gear wheel slidingly mounted on it and the other having the driven gear wheel slidingly mounted on it, and their respective wheels being capable of interlocking so as to rotate as a unit.

12. In a selective change speed transmission, a governor, a driving gear wheel, a second gear wheel, a third gear wheel driven by the driving gear wheel, and a fourth gear wheel driven by the third gear wheel, the second gear wheel being manually shiftable into connection with the first gear wheel for one speed and shiftable into connection with the fourth gear wheel for another speed, and means responsive to the action of the governor for shifting the driving gear wheel out of gear with the second gear wheel when the critical speed is reached.

13. A change speed transmission for motor vehicles having a master element capable of occupying an operative and a non-operative position, the tractor wheels of the vehicle being disconnected from the source of power when said master element is in non-operative position, holding means for holding said master element in operative position, and speed-responsive means for causing said master element to be moved to non-operative position.

14. A structure as specified in claim 13, in which the holding means is a positive lock, and the speed-responsive means includes a a spring for moving the master element to non-operative position, a speed limit governor, and means controlled by the governor for releasing said lock.

15. A selective gear, change speed transmission having a driving wheel capable of occupying an operative and a non-operative position and tending to move to non-operative position, a second gear wheel bodily movable for selecting the speed, means for holding the driving gear wheel in operative position, speed responsive means for releasing said holding means when a pre-ordained speed is reached, and means for restoring the driving wheel to operative position and simultaneously moving the selective gear wheel from a position of higher speed to a position of lower speed.

16. A structure as specified in claim 15, in which a spring urges the driving wheel to non-operative position and the holding means constitutes a positive lock opposing the force of said spring.

17. A structure as specified in claim 15, in which the speed responsive means for releasing the holding means includes a centrifugal governor, and means operated thereby for releasing the holding means.

18. A selective gear, change speed transmission having a driving gear wheel, a driven gear wheel, and intermediate gear wheels, the driving gear wheel being capable of occupying an operative and a non-operative position and tending to move to non-operative position, and the driven wheel being movable to two different positions, the first position for obtaining a high speed and the second position for obtaining a lower speed, holding means for holding the driving gear wheel in operative position, a governor, means controlled by the governor for releasing said holding means, and means for restoring the driving wheel to operative position and simultaneously moving the driven wheel to second position.

19. A structure as specified in claim 18, further characterized by the fact that the last mentioned means is manually operated.

20. A change speed transmission for motor vehicles having two bodily movable elements, the first being movable to one position for obtaining high speed and to a second position for obtaining a lower speed, the second of said bodily movable elements being movable to an operative position for causing the transmission to function as a transmitter of power and movable to a non-operative position for preventing the transmission to function, and means adapted to cause the second of said elements to move to operative position only when the first of said elements is moved to the position to obtain lower speed.

21. A change speed transmission for motor vehicles having two bodily movable elements, the first being movable to one position for obtaining high speed and to a second position for obtaining a lower speed, the second of said bodily movable elements being movable to an operative position for causing the transmission to function as a transmitter of power and movable to a non-operative position for preventing the transmission to function, speed controlled means for causing the second of said elements to move to non-operative position, and means for causing the second of said elements to move to operative position and simultaneously cause the first of said elements to move to the second position, for obtaining a lower speed.

22. A structure as specified in claim 21 in which the last recited means is controlled manually.

23. A change speed transmission for motor vehicles having two bodily movable elements, the first being movable to one position for obtaining high speed and to a second position for obtaining a lower speed, the second of said bodily movable elements being movable to an operative position for causing the transmission to function as a transmitter of power and movable to a non-operative position for preventing the transmission to function, a spring constantly urging the second of said elements to non-operative position, a latch for preventing the spring from moving the second of said elements to operative position, and a governor adapted to lift the latch.

24. A change speed transmission for motor vehicles having two bodily movable elements, the first being movable to one position for obtaining high speed and to a second position for obtaining a lower speed, the second of said bodily movable elements being movable to an operative position for causing the transmission to function as a transmitter of power and movable to a non-operative position for preventing the transmission to function a signal, and speed controlled means for causing the second of said elements to move to non-operative position and simultaneously actuating said signal for indicating that the critical speed is being approached.

25. In a motor vehicle having a change speed transmission between the source of power and the tractor wheels, said transmission having a shifting gear wheel for obtaining high speed in one position and a lower speed in a second position, a gear shifting lever for shifting said gear wheel, a master member capable of occupying an operative position for causing the transmission to function as a transmitter of power, and a non-operative position for preventing the transmission to function, a spring for urging said master member to non-operative position, speed responsive means for releasably holding said spring and thus preventing it from moving said master member to non-operative position, and resetting means operated by said shifting lever for resetting said spring.

26. In a motor vehicle having a change speed transmission between the source of power and the tractor wheels, said transmission having a shifting gear wheel for obtaining high speed in one position and a lower speed in a second position, a gear shifting lever for shifting said gear wheel, a master member capable of occupying an operative position for causing the transmission to function as a transmitter of power, and a non-operative position for preventing the transmission to function, a spring for urging said master member to non-operative position, speed responsive means for releasably holding said spring and thus preventing it from moving said master member to non-operative position, and resetting means operated by said shifting lever for resetting said spring and simultaneously shifting the shifting gear wheel to second, low speed, position.

27. In a motor vehicle having a change speed transmission between the source of power and the tractor wheels, said transmission having a shifting gear wheel for obtaining high speed in one position and a lower speed in a second position, a gear shifting lever for shifting said gear wheel, a master member capable of occupying an operative position for causing the transmission to function as a transmitter of power, and a non-operative position for preventing the transmission to function, a spring for urging said master member to non-operative position, speed responsive means for releasably holding said spring and thus preventing it from moving said master member to non-operative position, and a resetting lever operated by said shifting lever for resetting said spring and thus moving the lever member to operative position, said resetting lever being adapted to multiply the leverage to thus exert greater pressure upon the spring than is delivered upon the lever by the gear shifting lever.

28. A change speed transmission for motor vehicles having a gear wheel capable of occupying an operative and a non-operative position, holding means for normally holding said gear wheel in operative position, and speed responsive means for releasing said holding means.

29. A change speed transmission for motor vehicles having a gear wheel capable of occupying an operative and a non-operative position, a positive lock for holding said gear wheel in operative position, and speed responsive means for releasing said lock and causing said gear wheel to be moved to non-operative position.

30. In a self-propelled vehicle, the combination with running gear, a motor, and operator-controlled means for establishing operative connection between said motor and said running gear, of means arranged, upon departure from predetermined allowable operating conditions, to automatically alter an established connection between said motor and said running gear in such manner as to prevent continued operation under prohibited conditions, the arrangement being such that restoration of such established connection can be effected only through said operator-controlled means.

31. In a self-propelled vehicle, the combination with running gear, a motor, and operator-controlled means for establishing operative connection between said motor and said running gear, of speed-responsive means arranged, upon departure from predetermined allowable conditions of vehicle operation, to automatically disconnect said motor from said running gear, and to prevent re-connection until said operator-controlled means is actuated.

32. In a self-propelled vehicle, the combination, with running gear, a motor, transmission means for effecting driving connection between said motor and said running gear, and operator-controlled means whereby said transmission means can be rendered effective, of speed-responsive means arranged to automatically render said transmission means ineffective when a predetermined speed is exceeded, and to maintain said transmission means ineffective until said operator-controlled means is actuated to restore the transmission means to effective condition.

In witness whereof, I have hereunto subscribed my name.

DAVID W. SELLEK,